US007615587B2

United States Patent
Qiu et al.

(10) Patent No.: US 7,615,587 B2
(45) Date of Patent: Nov. 10, 2009

(54) GRINDING AID OF MINERAL MATERIALS IN AQUEOUS SUSPENSION, RESULTING AQUEOUS SUSPENSIONS AND USES THEREOF

(75) Inventors: Xueping Qiu, Rutland, VT (US); Jacques Mongoin, Quincieux (FR); Christian Jacquemet, Lyons (FR)

(73) Assignee: Coatex S.A.S., Genay (FR)

( * ) Notice: Subject to any disclaimer, the term of this patent is extended or adjusted under 35 U.S.C. 154(b) by 229 days.

(21) Appl. No.: 10/450,825

(22) PCT Filed: Dec. 18, 2001

(86) PCT No.: PCT/FR01/04025

§ 371 (c)(1),
(2), (4) Date: Jun. 18, 2003

(87) PCT Pub. No.: WO02/49766

PCT Pub. Date: Jun. 27, 2002

(65) Prior Publication Data

US 2004/0250970 A1  Dec. 16, 2004

(30) Foreign Application Priority Data

Dec. 20, 2000  (FR) ................... 00 16680

(51) Int. Cl.
*B02C 23/06* (2006.01)
*B01F 17/52* (2006.01)
*C09C 1/02* (2006.01)
*C09C 3/10* (2006.01)
*C09C 3/04* (2006.01)

(52) U.S. Cl. ............ 524/425; 524/80; 524/424; 524/401; 524/442; 524/556; 524/599; 241/16; 241/22

(58) Field of Classification Search ............ 524/80, 524/401, 424, 425, 442, 556, 599; 241/16, 241/22

See application file for complete search history.

(56) References Cited

U.S. PATENT DOCUMENTS 4,840,985 A * 6/1989 Gonnet et al. ........... 524/425
5,431,880 A * 7/1995 Kramer ..................... 422/56

FOREIGN PATENT DOCUMENTS

| EP | 0 100 948 | 2/1984 |
|---|---|---|
| EP | 0 113 048 | 7/1984 |
| EP | 0 278 880 | 8/1988 |
| EP | 0 542 643 | 5/1993 |
| EP | 0 542 644 | 5/1993 |
| WO | 99 23185 | 5/1999 |
| WO | 01 48093 | 7/2001 |

OTHER PUBLICATIONS

U.S. Appl. No. 11/167,170, filed Jun. 28, 2005, Mongoin, et al.
U.S. Appl. No. 10/450,454, filed Jun. 19, 2003, Mongoin, et al.

* cited by examiner

*Primary Examiner*—Roberto Rábago
(74) *Attorney, Agent, or Firm*—Oblon, Spivak, McClelland, Maier & Neustadt, L.L.P.

(57) ABSTRACT

The invention concerns the use of hydrosoluble homopolymers and/or copolymers of acrylic/or methacrylic acid with one or more acrylic, vinyl or allyl monomers as an aid to the grinding of mineral particles in aqueous suspension, providing them by their use particular optical properties. The invention also concerns the said aqueous suspensions and their uses in the fields of paper and paint.

10 Claims, No Drawings

GRINDING AID OF MINERAL MATERIALS IN AQUEOUS SUSPENSION, RESULTING AQUEOUS SUSPENSIONS AND USES THEREOF

The present invention concerns the technical sector of mineral fillers, notably for papermaking applications, and their appropriate processing in order to improve either the method of manufacturing the sheet of paper, or its properties.

The invention concerns the use of homopolymers and/or copolymers of acrylic and/or methacrylic acid with one or more acrylic, vinyl or allyl monomers as an aid to the grinding of pigments and/or mineral fillers in aqueous suspension.

The invention also concerns the said aqueous suspensions of pigments and/or mineral fillers and their uses notably in the fields of paper, such as amongst other things the manufacture or coating of paper, with the obtaining in particular of equal or better properties of the pigment and/or filler, and notably its ability to scatter visible light, expressed by the light scattering coefficient S.

The invention finally concerns the papers manufactured and/or coated by the use of the said aqueous suspensions of pigments and/or mineral fillers.

The invention also concerns the paints obtained by the use of the said aqueous suspensions of pigments and/or mineral fillers.

For a long time now experts have known the use of agents for grinding mineral particles in aqueous suspension consisting of acrylic polymers and/or copolymers, of low molecular weight, completely or partially neutralised by various neutralisation agents (FR 2 603 042, EP 0 100 947, EP 0 127 388, EP 0 129 329, EP 0 542 644).

Skilled men also know the use of grinding agents consisting of the fraction of the acrylic polymers and/or copolymers whose specific viscosity is between 0.3 and 0.8 (patents FR 2 488 814, EP 0 100 948, EP 0 542 643).

However, these various low molecular weight grinding agents, which make it possible to obtain aqueous suspensions of mineral particles which are refined, fluid and stable over time, do not make it possible to achieve aqueous suspensions of pigments and/or mineral fillers, notably calcium carbonate, which are refined and have sufficient capability of scattering visible light, expressed by the light scattering coefficient S, as required by the end user.

In fact this end user has whiter papers than previously thanks to the use of calcium carbonate as a replacement for kaolin, but this calcium carbonate has the drawback, compared with the kaolin previously used, of giving sheets of paper presenting reduced optical properties, which is a drawback. Because of this the user feels the need to increase these optical properties whilst keeping the brightness acquired by the use of calcium carbonate.

Confronted with this problem of improvement in the optical properties, the Applicant then found, surprisingly, that the selection of the neutralisation of the homopolymers and/or hydrosoluble copolymers of acrylic acid and/or methacrylic acid with one or more acrylic, vinyl or allyl monomers makes it possible to obtain aqueous suspensions of pigments and/or mineral fillers, notably calcium carbonate, which are refined, have sufficient ability to scatter visible light as required by the end user, make it possible to obtain papermaking formulations, such as coating colors or a mass filler for the paper, which have improved properties of opacity, and to obtain paint formulations having improved properties of opacity.

One of the aims of the invention is the use of homopolymers and/or hydrosoluble copolymers of acrylic acid and/or methacrylic acid with one or more acrylic, vinyl or allyl monomers specifically neutralised, as an agent assisting the grinding of pigments and/or mineral fillers in aqueous suspension for obtaining aqueous suspensions of pigments and/or mineral fillers, notably calcium carbonate, which are refined, have sufficient ability to scatter visible light as required by the end user, make it possible to achieve papermaking formulations such as notably coating colors or a mass filler for the paper, which have improved properties of opacity.

Another aim of the invention, apart from those already mentioned, is to provide aqueous suspensions of mineral materials which are refined, obtained by grinding and characterised in that they have an increased ability to scatter visible light and in that they contain from 0.05% to 5% by dry weight and preferably 0.3% to 1.0% by dry weight with respect to the dry weight of the mineral material, of agent for assisting the grinding of an aqueous suspension used according to the invention.

Finally, a supplementary aim of the invention concerns the use of these mineral aqueous suspensions in the fields of paint, the mass filling and the coating of paper as well as the coating colors containing the said mineral aqueous suspensions.

Contrary to the teaching of the prior art (EP 0 542 643-EP 0 542 644), which indicates that the molar percentage of neutralisation of active acid sites of the polymer by a neutralisation agent containing a magnesium ion is between 40% and 60% in order to obtain an improved grinding agent, the Applicant has found surprisingly that the selection of the molar percentage of neutralisation of the active acid sites of the polymer by a neutralisation agent containing a calcium ion must be between 15% and 40% in order to obtain the aforementioned properties, the molar ratio of the neutralisation of the active acid sites of the polymer by one or more monofunctional agents being between 7% and 70%, the molar ratio of neutralisation of the active acid sites of the polymer by a neutralisation agent containing a magnesium, baryum, zinc or aluminium ion, or a difunctional amine, or mixtures thereof, and containing particularly a magnesium ion being between 0% and 30%, and a molar ratio of non-neutralised active acid sites between 15% and 78%.

The monofunctional neutralisation agents are chosen from amongst the hydroxides of alkali cations, in particular sodium and potassium, or lithium or ammonia solution, or amongst the aliphatic and/or cyclic primary or secondary amines such as for example ethanolamines, mono and diethylamine or cyclohexylamine and are very particularly chosen from amongst the compounds containing a sodium ion.

These homopolymers and/or copolymers result from various known methods of radical type polymerisation using the polymerisation initiators well-known to experts such as for example compounds based on hydroxylamine or using the polymerisation initiators such as peroxides such as notably hydrogen peroxide, tert-butyl hydroperoxide or persalts such as notably sodium persulphate, ammonium persulphate, potassium persulphate or the like, or sodium hypophosphite, hypophosphorous acid or phosphorous acid and/or their salts in the possible presence of metallic salts, for example iron or copper, in a polymerisation medium which may be water, methanol, ethanol, propanol, isopropanol, butanols or mixtures thereof or dimethylformamide, dimethylsulphoxide, tetrahydrofuran, acetone, methyl ethyl ketone, ethyl acetate, butyl acetate, hexane, heptane, benzene, toluene or xylene, and in the possible presence of molecular mass regulators, also referred to as transfer agents, such as notably mercaptoethanol, thioglycolic acid and its esters, n-dodecylmercaptan, acetic, tartric, lactic, citric, gluconic or glucoheptonic acid, 2-mercaptopropionic acid, thiodiethanol, halogenated solvents such as carbon tetrachloride, chloroform, methylene chloride, monopropylene glycol ethers, or mixtures thereof and the like.

These homopolymers used as a grinding aid agent according to the invention result from the various afore-mentioned methods of radical type polymerisation of acrylic acid or methacrylic acid.

The copolymers used as a grinding aid agent according to the invention result from the various aforementioned methods of radical-type copolymerisation of acrylic acid with at least one of the monomers chosen from amongst methacrylic acid, itaconic acid, crotonic acid, fumaric acid, maleic anhydride and/or 2-acrylamido-2-methyl-1-propane sulphonic acid in acid form or partially neutralised, 2-methacrylamido-2-methyl-1-propane sulphonic acid in acid form or partially neutralised, 3-methacrylamido-2-hydroxy-1-propane sulphonic acid in acid form or partially neutralised, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl sulphonic acid, styrene sulphonic acid and/or its salts, vinyl sulphonic acid, sodium methallylsulphonate, sulphopropyl acrylate or methacrylate, sulphomethylacrylamide, sulphomethylmethacrylamide or from acrylamide, methylacrylamide, esters of acrylic or methacrylic acids such as notably ethyl acrylate, butyl acrylate, methyl methacrylate, acrylate or methacrylate phosphate of ethylene or propylene glycol or from amongst vinylpyrrolidone, vinylcaprolactam, isobutylene, diisobutylene, vinyl acetate, styrene, alphamethylstyrene, vinylmethylether, or allyl compounds such as notably allylamine and its derivatives.

These homopolymers and/or copolymers used as a grinding aid agent according to the invention resulting from the various aforementioned radical-type polymerisation methods can also be processed by any known means for isolating in powder form and using it in this form.

According to another variant, the homopolymer and/or copolymer issuing from the polymerisation reaction may, possibly before or after the neutralisation reaction, be processed and separated into several phases, according to static or dynamic methods known to skilled men, by means of one or more polar solvents belonging notably to the group consisting of water, methanol, ethanol, propanol, isopropanol, the butanols, acetone, tetrahydrofuran or mixtures thereof. One of the phases then corresponds to the polymer used according to the invention as an agent for assisting the grinding of mineral materials in aqueous suspension.

These homopolymers and/or copolymers used as a grinding aid agent according to the invention are selectively neutralised so that the molar percentage of neutralisation of the active acid sites of the polymer by means of a neutralisation agent containing the calcium ion is between 15% and 40% with a molar ratio of neutralisation of the active acid sites of the polymer by means of one or more monofunctional neutralisation agents and in particular by means of a neutralisation agent containing a sodium ion of between 7% and 70%, a molar ratio of neutralisation of the active acid sites of the polymer by means of a neutralisation agent containing, magnesium, baryum, zinc, aluminium ion, or a difunctional amine, or mixtures thereof, and particularly a neutralisation agent containing a magnesium ion of between 0% and 30%, and a molar ratio of non-neutralised active acid sites of between 15% and 78%.

This molar percentage of neutralisation of the active acid sites of the polymer by means of a neutralisation agent containing a calcium ion is between 15% and 40% with a molar ratio of neutralisation of the active acid sites of the polymer by means of one or more monofunctional neutralisation agents and in particular by means of a neutralisation agent containing a sodium ion preferentially between 20% and 50%, a molar ratio of neutralisation of the active acid sites of the polymer by means of a neutralisation agent containing a magnesium, baryum, zinc, or aluminium ion, or a difunctional amine, or mixtures thereof, and particularly a neutralisation agent containing a magnesium ion of between 0% and 30%, and a molar ratio of the non-neutralised active acid sites preferentially between 20% and 40%.

Thus, according to the invention, the use of homopolymers and/or copolymers of acrylic acid and/or methacrylic acid with one or more acrylic, vinyl or allyl monomers as an agent for assisting the grinding of pigments and/or mineral fillers in aqueous suspension is characterised in that the said homopolymers and/or copolymers of acrylic acid and/or methacrylic acid with one or more acrylic, vinyl or allyl monomers are neutralised so that the molar percentage of neutralisation of the active acid sites of the polymer by means of a neutralisation agent containing a calcium ion is between 15% and 40% with a molar ratio of neutralisation of the active acid sites by means of one or more monofunctional neutralisation agents and in particular by means of a neutralisation agent containing a sodium ion of between 7% and 70%, a molar ratio of neutralisation of the active acid sites of the polymer by means of a neutralisation agent containing a magnesium, baryum, zinc, or aluminium ion, or a difunctional amine, or mixtures thereof, and particularly a neutralisation agent containing a magnesium ion of between 0% and 30%, and a molar ratio of non-neutralised active acid sites of between 15% and 78%.

Preferentially, the use according to the invention of homopolymers and/or copolymers of acrylic acid and/or methacrylic acid with one or more acrylic, vinyl or allyl monomers as an agent for assisting the grinding of pigments and/or mineral fillers in aqueous suspension is characterised in that the said homopolymers and/or copolymers of acrylic acid and/or methacrylic acid with one or more acrylic, vinyl or allyl monomers are neutralised so that the molar percentage of neutralisation of the active acid sites of the polymer by means of a neutralisation agent containing a calcium ion is between 15% and 40% with a molar ratio of neutralisation of the active acid sites by means of one or more monofunctional neutralisation agents and in particular by means of a neutralisation agent containing a sodium ion preferentially of between 20% and 50%, a molar ratio of neutralisation of the active acid sites of the polymer by means of a neutralisation agent containing a magnesium, baryum, zinc, or aluminium ion, or a difunctional amine, or mixtures thereof, and particularly a neutralisation agent containing a magnesium ion of between 0% and 30%, and a molar ratio of non-neutralised active acid sites of between 20% and 40%.

The homopolymers and/or copolymers intended to be used according to the invention as an agent for assisting the grinding in water of mineral particles are selected from amongst the homopolymers or copolymers having a weight average molecular weight in terms of $M_w$ of between 1500 and 50,000, preferentially between 5000 and 25,000, determined by aqueous GPC whose standards, used as references, belong to a series of sodium polyacrylates sold by the company Polymer Standards Service under the names PSS-PAA varying from 18K to 2K.

In addition, the use according to the invention of a selection of homopolymers and/or copolymers of acrylic and/or methacrylic acid with one or more acrylic, vinyl or allyl monomers allows the grinding of mineral substances, notably calcium carbonate, resulting in the obtaining of aqueous suspensions of mineral materials which are refined and have sufficient ability to scatter visible light as required by the end user making it possible to achieve papermaking and/or paint formulations, such as notably coating colors or the mass filler for the paper, which have improved properties of opacity.

Thus, according to the invention, the aqueous suspensions of pigments and/or mineral fillers are characterised in that they contain the said grinding aid agent and in that they have an ability to scatter visible light expressed by a light scattering coefficient S greater than 100 m²/kg for a coating weight of 20 g/m².

This ability to scatter light is expressed by the Kubelka-Munk light scattering coefficient, determined by the method, well-known to experts, described in the publications of Kubelka and Munk. (Zeitschrift für Technische Physik 12,539, (1931)), de Kubelka (J.Optical Soc.Am. 38(5),448, (1948) et J.Optical Soc.Am. 44(4),330,(1954)).

For each test, a sheet of synthetic paper sold by Arjo Wiggins Teape under the name Synteape is available.

Before being coated using a Hand Coatex model KC202 laboratory coater and for each test, this sheet of paper of size 26 cm×18 cm and with a specific weight of 60 to 65 g/m² is weighed and then subjected to light radiation with a wavelength of 457 nm on a black plate by means of an Elrepho™ 2000 spectrophotometer from Datacolor (Switzerland) in order to determine the reflectance factor $R_b$ of the non-coated paper on a black background.

Each of the coating colors formulated with a binder (12 parts of styrene-acrylic binder (Acronal™ S360D) for 100 g dry of the mineral filler to be tested) to be tested is then applied to this preweighed sheet of paper by means of a Hand Coatex model KC202 laboratory Coatex.

Each sheet of paper thus coated at a coating weight of between 8 and 30 g/m² is then subjected to light radiation with a wavelength of 457 nm by means of an Elrepho™ 3000 spectrophotometer from Datacolor (Switzerland) on a black plate in order to determine the reflectance factor $R_0$ of the paper on a black background and on a stack of at least 10 non-coated sheets of paper in order to determine the reflectance factor $R_1$ of coated papers on a white background, r being the reflectance factor of the stack of uncoated sheets of paper.

The reflectance factor $R_{SC}$ of the coating alone, on a black background, is then determined by means of the formula:

$$R_{SC} = \frac{R_1 \cdot R_b - R_0 \cdot r}{(R_1 - R_0) \cdot rR_b + R_b - r}$$

as well as the transmittance $T_{SC}$ of the layer $$T_{SC}^2 = \frac{(R_0 - R_{SC})(1 - R_{SC}R_b)}{R_b}$$

resulting in a theoretical reflectance value R for a coating with an infinite thickness given by the formula:

$$\frac{1 - T_{SC}^2 + R_{SC}^2}{R_{SC}} = \frac{1 + R_\infty^2}{R_\infty}$$

From this formula the light scattering coefficient S can be calculated knowing that, for a weight of coating P, $$S.P. = \frac{1}{b} \coth^{-1} \frac{(1 - aR_{SC})}{bR_{SC}}$$

Where $$a = 0 \cdot 5 \left( \frac{1}{R_\infty} + R_\infty \right)$$

with $$b = 0.5 \left( \frac{1}{R_\infty} - R_\infty \right)$$

This light scattering coefficient S is traced according to the coating weight and the value S, for a coating weight equal to 20 g/m², is determined by interpolation.

They are also characterised in that the filler and/or pigment is chosen from amongst a natural calcium carbonate such as notably calcite, chalk or marble, synthetic calcium carbonate, also known as precipitated calcium carbonate, dolomites, magnesium hydroxide, gypsum or aluminium hydroxide or mixtures thereof or any other filler and/or pigment normally used in the papermaking and paint field.

The aqueous suspensions of fillers and/or pigments according to the invention are characterised more particularly in that they contain from 0.05% to 5% by dry weight of the said agent with respect to the total dry weight of the fillers and/or pigments, and even more particularly 0.3% to 1.0% by dry weight of the said agent with respect to the total dry weight of the fillers and/or pigments and in that they have a visible light scattering capacity measured by means of the value of the light scattering coefficient S greater than 100 m²/kg for a coating weight of 20 g/m² measured according to the aforementioned method.

In practice, the operation of grinding the mineral substance to be refined consists of grinding the mineral substance with a body grinding into very fine particles in an aqueous medium containing part orall of the quantity of grinding aid agent. An aqueous suspension of the mineral substance to be ground is formed.

During the use of a part of the quantity of the grinding aid agent, the complement is added in parallel during the operation of mechanical grinding.

To the suspension of mineral substance to be ground, the grinding body is added with a particle size advantageously between 0.20 and 4 millimeters. The grinding body is generally in the form of particles of materials as diverse as silicon oxide, aluminium oxide, zirconium oxide or mixtures thereof, as well as the high-hardness synthetic resins, steels, or others. An example of a composition of such grinding bodies is given by the patent FR 2 303 681, which describes grinding elements formed by 30 to 70% by weight zirconium oxide, 0.1 to 5% aluminium oxide and 5 to 20% silicon oxide. The grinding body is preferably added to the suspension in a quantity such that the ratio by weight between this grinding material and the mineral substance to be ground is at least 2/1, this ratio preferably being between the limits 3/1 and 5/1.

The mixture of the suspension and grinding body is then subjected to the mechanical stirring action such as the one which occurs in a conventional grinder with micro-elements.

The grinding aid agent according to the invention is also introduced into the mixture formed by the aqueous suspension of mineral substances and by the grinding body at the rate of 0.05% to 5% by weight, and preferentially 0.3% to 1.0% by weight of the dried fraction of the said polymers with respect to the dry mass of the mineral substance to be refined.

The time required to result in an excellent degree of fineness of the mineral substance after grinding varies according to the nature and quantity of the mineral substances to be ground, and according to the stirring mode used and the temperature of the medium during the grinding operation.

The aqueous suspensions thus obtained can be used in the field of the mass filling and/or coating of paper.

The uncoated mass filler compositions according to the invention are characterised in that they contain aqueous suspensions of mineral materials according to the invention and in that they have an ability to scatter visible light measured by the value of the light scattering coefficient S greater than 100 $m^2/kg$ for a coating weight of 20 $g/m^2$ measured according to the aforementioned method.

The papers manufactured and/or coated are characterised in that they contain the said aqueous suspensions of fillers and/or pigments according to the invention.

The papers coated by the use of the coating color according to the invention are characterised in that they have increased opacity, that is to say opacity greater than the opacity of the coated papers of the prior art.

The scope and interest of the invention will be better perceived by virtue of the following examples.

EXAMPLE 1

This example concerns the selection of the agent neutralising the homopolymer and/or copolymer intended according to the invention to be used as a grinding aid agent making it possible to obtain an aqueous suspension of natural calcium carbonate with an increased visible light scattering capacity.

For each test, the different grinding aid agents are tested by the introduction, according to the quantities indicated in each test expressed as a percentage by dry weight with respect to the weight of dry calcium carbonate to be ground, of grinding aid agent in a suspension of calcium carbonate to be ground.

This natural calcium carbonate to be ground is a marble with a granulometry such that the median diameter is equal to about 20 micrometers.

The suspension circulates in a grinder of the Dyno-Mill™ type with a fixed cylinder and rotating impeller, whose grinding body consists of corundum balls with a diameter in the range 0.6 millimeters to 1.0 millimeter.

The total volume occupied by the grinding body is 1150 cubic centimeters whilst its weight is 2900 g.

The grinding chamber has a volume of 1400 cubic centimeters.

The circumferential speed of the grinder is 10 meters per second.

The calcium carbonate suspension is recycled at the rate of 18 liters per hour.

The discharge of the Dyno-Mill™ grinder is provided with a separator with a 200 micron mesh for separating the suspension resulting from the grinding and the grinding body. The temperature during each grinding test is maintained at approximately 60° C.

At the end of the grinding (To), a sample of the pigmentary solution is recovered in a flask. The granulometry of this suspension equal to 72% of particles having a diameter less than 1 micrometer is measured by means of a Sédigraph™ 5100 granulometer from Micromeritics.

The final concentration of the aqueous suspension is adjusted to 71% dry matter by the use of the methods and means for increasing concentration well known to skilled man in the art and the light scattering coefficient S is then measured according to the method previously described.

Test No 1:

This test, which illustrates the prior art, uses 0.50% by dry weight with respect to the dry weight of calcium carbonate, of a totally neutralised sodium polyacrylate with a weight average molecular weight in terms of $M_w$ of 7000, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 90 $m^2/kg$ for a coating weight of 20 $g/m^2$.

Test No 2:

This test, which illustrates the prior art, uses 0.55% by dry weight with respect to the dry weight of calcium carbonate, of a mixed magnesium and sodium polyacrylate (50% magnesium-50% sodium molar) with a weight average molecular weight in terms of $M_w$ of 5500, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 87 $m^2/kg$ for a coating weight of 20 $g/m^2$.

Test No 3:

This test, which illustrates the prior art, uses 0.55% by dry weight with respect to the dry weight of calcium carbonate, of a mixed sodium and calcium polyacrylate (70% sodium-30% calcium molar) with a weight average molecular weight in terms of $M_w$ of 4500, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 95 $m^2/kg$ for a coating weight of 20 $g/m^2$.

Test No 4:

This test, which illustrates a field outside the invention, uses 0.60% by dry weight with respect to the dry weight of calcium carbonate, of a sodium polyacrylate. (5% sodium-95% free carboxyl molar) with a weight average molecular weight in terms of $M_w$ of 6500 determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 93 $m^2/kg$ for a coating weight of 20 $g/m^2$.

Test No 5:

This test, which illustrates the invention, uses 0.55% by dry weight with respect to the dry weight of calcium carbonate, of a mixed polyacrylate of sodium-calcium-magnesium (7% sodium-30% calcium-15% magnesium-48% free carboxyl molar) with a weight average molecular weight in terms of $M_w$ of 5500, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 132 $m^2/kg$ for a coating weight of 20 $g/m^2$.

Test No 6:

This test, which illustrates the invention, uses 0.55% by dry weight with respect to the dry weight of calcium carbonate, of a mixed polyacrylate of sodium-calcium-magnesium (15% sodium-30% calcium-15% magnesium-40% free carboxyl molar) with a weight average molecular weight in terms of $M_w$ of 5500, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 130 $m^2/kg$ for a coating weight of 20 $g/m^2$.

Test No 7:

This test, which illustrates the invention, uses 0.55% by dry weight with respect to the dry weight of calcium carbonate, of a mixed polyacrylate of sodium-calcium-magnesium (25% sodium-30% calcium-15% magnesium-30% free carboxyl molar) with a weight average molecular weight in terms of $M_w$ of 5500, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 145 $m^2/kg$ for a coating weight of 20 $g/m^2$.

Test No 8:

This test, which illustrates a field outside the invention, uses 0.55% by dry weight with respect to the dry weight of calcium carbonate, of a mixed sodium and calcium polyacrylate (7% sodium-7% calcium-86% free carboxyl molar) with a weight average molecular weight in terms of $M_w$ of 5500, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 95 $m^2/kg$ for a coating weight of 20 $g/m^2$.

Test No 9:

This test, which illustrates the invention, uses 0.55% by dry weight with respect to the dry weight of calcium carbonate, of a mixed polyacrylate of sodium and calcium (7% sodium-15% calcium-78% free carboxyl molar) with a weight average molecular weight in terms of $M_w$ of 5500, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 125 $m^2/kg$ for a coating weight of 20 $g/m^2$.

Test No 10:

This test, which illustrates the invention, uses 0.55% by dry weight with respect to the dry weight of calcium carbonate, of a mixed polyacrylate of sodium and calcium (7% sodium-40% calcium-53% free carboxyl molar) with a weight average molecular weight in terms of $M_w$ of 5500, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 140 $m^2/kg$ for a coating weight of 20 $g/m^2$.

Test No 11:

This test, which illustrates the invention, uses 0.55% by dry weight with respect to the dry weight of calcium carbonate, of a mixed polyacrylate of sodium and calcium (15% sodium-30% calcium-55% free carboxyl molar) with a weight average molecular weight in terms of $M_w$ of 5500, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 140 $m^2/kg$ for a coating weight of 20 $g/m^2$.

Test No 12:

This test, which illustrates the invention, uses 0.55% by dry weight with respect to the dry weight of calcium carbonate, of a mixed polyacrylate of sodium-calcium-magnesium (15% sodium-30% calcium-15% magnesium-40% free carboxyl molar) with a weight average molecular weight in terms of $M_w$ of 5500, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 130 $m^2/kg$ for a coating weight of 20 $g/m^2$.

Test No 13:

This test, which illustrates the invention, uses 0.65% by dry weight with respect to the dry weight of calcium carbonate, of a mixed polyacrylate of sodium-calcium-magnesium (15% sodium-30% calcium-30% magnesium-25% free carboxyl molar) with a weight average molecular weight in terms of $M_w$ of 5500, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 143 $m^2/kg$ for a coating weight of 20 $g/m^2$.

The reading of the different results shows that, in order to obtain the aforementioned properties, the selection of the molar percentage and neutralisation of the active acid sites of the polymer by means of a neutralisation agent containing a calcium ion must be between 15% and 40%, the molar ratio of neutralisation of the active acid sites of the polymer by means of one or more monofunctional agents being between 7% and 70%, the molar ratio of neutralisation of the active acid sites of the polymer by means of a neutralisation agent containing a magnesium ion being between 0% and 30%, the molar ratio of the non-neutralised active acid sites being between 15% and 78%.

EXAMPLE 2

This example concerns the molecular weight of the homopolymer and/or copolymer intended according to the invention to be used as a grinding aid agent making it possible to obtain an aqueous suspension of natural calcium carbonate with an increased visible light scattering capacity.

For each test, the grinding aid agents are tested with the same procedure and the same equipment as in example 1.

Test No 14:

This test, which illustrates the invention, uses 0.35% by dry weight with respect to the dry weight of calcium carbonate, of a mixed polyacrylate of sodium and calcium (50% sodium-30% calcium-20% free carboxyl molar) with a weight average molecular weight in terms of $M_w$ of 7000, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 145 $m^2/kg$ for a coating weight of 20 $g/m^2$.

Test No 15:

This test, which illustrates the invention, uses 0.23% by dry weight with respect to the dry weight of calcium carbonate, of a mixed polyacrylate of sodium and calcium (55% sodium-30% calcium-15% free carboxyl molar) with a weight average molecular weight in terms of $M_w$ of 7750, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 145 $m^2/kg$ for a coating weight of 20 $g/m^2$.

Test No 16:

This test, which illustrates the invention, uses 0.23% by dry weight with respect to the dry weight of calcium carbonate, of a mixed polyacrylate of sodium-calcium-magnesium (50% sodium-15% calcium-15% magnesium-20% free carboxyl molar) with a weight average molecular weight in terms of $M_w$ of 10 000, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 155 $m^2/kg$ for a coating weight of 20 $g/m^2$.

Test No 17:

This test, which illustrates the invention, uses 0.45% by dry weight with respect to the dry weight of calcium carbonate, of a mixed polyacrylate of sodium-calcium-magnesium (25% sodium-35% calcium-10% magnesium-30% free carboxyl molar) with a weight average molecular weight in terms of $M_w$ of 6000, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 145 $m^2/kg$ for a coating weight of 20 $g/m^2$.

Test No 18:

This test, which illustrates the invention, uses 0.30% by dry weight with respect to the dry weight of calcium carbonate, of a mixed polyacrylate of sodium and calcium (50% sodium-30% calcium-20% free carboxyl molar) with a weight average molecular weight in terms of $M_w$ of 17000, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 125 $m^2/kg$ for a coating weight of 20 $g/m^2$.

Test No 19:

This test, which illustrates the invention, uses 0.50% by dry weight with respect to the dry weight of calcium carbonate, of a copolymer acrylic acid-acrylamido methyl propane sulfonic acid (respectively 95%-5% weight) and neutralised with sodium-calcium-magnesium(25% free carboxylic-35% sodium-25% calcium-15% magnesium molar) with a mean molecular weight in terms of $M_w$ weight of 10000, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 135 $m^2/kg$ for a coating weight of 20 $g/m^2$.

Test No 20:

This test, which illustrates the invention, uses 0.50% by dry weight with respect to the dry weight of calcium carbonate, of a copolymer acrylic acid-acrylamide (respectively 90%-10% weight) and neutralised with sodium-calcium-magnesium (25% free carboxylic-35% sodium-25% calcium-15% magnesium molar) with a mean molecular weight in terms of $M_w$ weight of 10000, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 150 $m^2/kg$ for a coating weight of 20 $g/m^2$.

Test No 21:

This test, which illustrates the invention, uses 0.55% by dry weight with respect to the dry weight of calcium carbonate, of a copolymer acrylic acid-methacrylic acid (respectively 85%-15% weight) and neutralised with sodium-calcium-magnesium(25% free carboxylic-35% sodium-25% calcium-15% magnesium molar) with a mean molecular weight in terms of $M_w$ weight of 10000, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 137 $m^2/kg$ for a coating weight of 20 $g/m^2$.

Test No 22:

This test, which illustrates the invention, uses 0.55% by dry weight with respect to the dry weight of calcium carbonate, of a copolymer acrylic acid-ethyl acrylate (respectively 95%-5% weight) and neutralised with sodium-calcium-magnesium(25% free carboxylic-35% sodium-25% calcium-15% magnesium molar) with a mean molecular weight in terms of $M_w$ weight of 10000, determined by aqueous. GPC whose standards, used as references, belong to a series of sodium polyacrylates sold by the company Polymer Standards Service under the names PSS-PAA varying from 18K to 2K.

The light scattering coefficient S obtained according to the method previously described is 129 $m^2/kg$ for a coating weight of 20 $g/m^2$.

Test No 23:

This test, which illustrates the invention, uses 0.55% by dry weight with respect to the dry weight of calcium carbonate, of a copolymer acrylic acid-butyl acrylate (respectively 95%-5% weight) and neutralised with sodium-calcium-magnesium(25% free carboxylic-35% sodium-25% calcium-15% magnesium molar) with a mean molecular weight in terms of $M_w$ weight of 10000, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 123 $m^2/kg$ for a coating weight of 20 $g/m^2$.

Test No 24:

This test, which illustrates the invention, uses 0.55% by dry weight with respect to the dry weight of calcium carbonate, of a copolymer acrylic acid-methacrylate ethylene glycol phosphate (respectively 95%-5% weight) and neutralised with sodium-calcium-magnesium(25% free carboxylic-35% sodium-25% calcium-15% magnesium molar) with a mean molecular weight in terms of $M_w$ weight of 10000, determined by aqueous GPC whose standards, used as references, belong to a series of sodium polyacrylates sold by the company Polymer Standards Service under the names PSS-PAA varying from 18K to 2K.

The light scattering coefficient S obtained according to the method previously described is 128 m²/kg for a coating weight of 20 g/m².

The reading of the different results shows that, in order to obtain the aforementioned properties, the mean molecular weight in terms of $M_w$ weight of the homopolymer or copolymer used according to the invention, must comprised between 1500 and 50 000, preferably between 5000 and 25000, determined by aqueous GPc whose standards, used as references, belong to a series of sodium polyacrylates sold by the company Polymer Standards Service under the names PSS-PAA varying from 18K to 2K.

The invention claimed is:

1. A process for grinding an aqueous suspension of a mineral filler comprising:
    1) preparing a mixture comprising an aqueous suspension of mineral filler, a grinding aid agent and a grinding substance;
    2) grinding the mixture; and
    3) concentrating the ground aqueous suspension of a mineral filler and a grinding aid agent after grinding;
    wherein a per cent dry weight of the mineral filler and grinding aid agent is less than 71% in the aqueous suspension before concentrating; and
    said grinding aid agent is introduced into the aqueous suspension at the rate of 0.3% to 1% by dry weight with respect to the dry weight of mineral material,
    the grinding aid agent comprises homopolymers and/or copolymers of acrylic acid and/or methacrylic acid with one or more acrylic, vinyl or allyl monomers neutralised so that the molar percentage of neutralisation of the active acid sites of the polymer by means of a neutralisation agent containing a calcium ion is between 15% and 40% with a molar percentage of neutralisation of the active acid sites by means of one or more monofunctional neutralisation agents of between 7% and 70%, a molar percentage of neutralisation of the active acid sites of the polymer by means of a neutralisation agent containing magnesium, barium, zinc or aluminum ion, or a difunctional amine, or mixtures thereof, of between 0% and 30%, and a molar percentage of non-neutralised active acid sites of between 15% and 78%, and
    a weight average molecular weight of the homopolymers and/or copolymers of acrylic acid and/or methacrylic acid with one or more acrylic, vinyl or allyl monomers is between 5000 and 25,000.

2. The process of claim 1, wherein the homopolymers and/or copolymers of acrylic acid and/or methacrylic acid with one or more acrylic, vinyl or allyl monomers are neutralised so that the molar percentage of neutralisation of the active acid sites of the polymer by means of a neutralisation agent containing a calcium ion is between 15% and 40% with a molar percentage of neutralization of the active acid sites by means of one or more monofunctional neutralisation agents of between 20% and 50%, a molar percentage of neutralisation of the active acid sites of the polymer by means of a neutralisation agent containing magnesium, barium, zinc or aluminum ion, or a difunctional amine, or mixtures thereof, of between 0% and 30%, and a molar percentage of non-neutralised active acid sites of between 20% and 40%.

3. The process according to claim 1, wherein the monofunctional neutralisation agent or agents is one or more selected from the group consisting of hydroxides of alkali cations, lithium or ammonia solution, aliphatic and/or cyclic primary or secondary amines, monoethylamine, diethylamine and cyclohexylamine.

4. The process according to claim 1, wherein said grinding aid agent is a homopolymer of acrylic or methacrylic acid.

5. The process according to claim 1, wherein said agent is a hydrosoluble copolymer of acrylic/or methacrylic acid with one or more acrylic, vinyl or allyl monomers selected from the group consisting of acrylic acid, methacrylic acid, itaconic acid, crotonic acid, fumaric acid, maleic anhydride and/or 2-acrylamido-2-methyl-1-propane sulphonic acid in acid form or partially neutralised, 2-methacrylamido-2-methyl-1-propane sulphonic acid in acid form or partially neutralised, 3-methacrylamido-2-hydroxy-1-propane sulphonic acid in acid form or partially neutralised, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-l-sulphonic acid, ethylene sulphonic acid, propene sulphonic acid, styrene sulphonic acid and/or its salts, vinyl sulphonic acid, sodium methallylsulphonate, sulphopropyl acrylate or methacryl ate, sulphomethylacryl amide, sulphomethylmethacryl amide, acrylamide, methylacrylamide, esters of acrylic or methacrylic acids, acrylate or methacrylate phosphate of ethylene or propylene glycol, vinylpyrrolidone, vinylcaprolactam, isobutylene, diisobutylene, vinyl acetate, styrene, alpha-methylstyrene, vinylmethylether, allyl compounds, and mixtures thereof.

6. The process according to claim 1, wherein the homopolymer and/or copolymer is produced from a polymerisation reaction and separated into several phases by means of one or more polar solvents selected from the group consisting of water, methanol, ethanol, propanol, isopropanol, the butanols, acetone, tetrahydrofuran, and mixtures thereof.

7. The process according to claim 1, wherein said grinding aid agent is in the form of a powder.

8. A process for grinding an aqueous suspension of calcium carbonate comprising:
    1) preparing a mixture comprising an aqueous suspension of calcium carbonate, a grinding aid agent and a grinding substance;
    2) grinding the mixture;
    3) concentrating the aqueous suspension of calcium carbonate and grinding aid agent after grinding; and
    4) measuring a light scattering coefficient s of the concentrated, ground aqueous suspension of calcium carbonate and grinding aid agent;
    wherein a per cent dry weight of the calcium carbonate and grinding aid agent is less than 71% in the aqueous suspension before concentrating; and
    said grinding aid agent is introduced into the aqueous suspension at the rate of 0.3% to 1% by dry weight with respect to the dry weight of calcium carbonate,
    the grinding aid agent comprises homopolymers and/or copolymers of acrylic acid and/or methacrylic acid with one or more acrylic, vinyl or allyl monomers neutralised so that the molar percentage of neutralisation of the active acid sites of the polymer by means of a neutralisation agent containing a calcium ion is between 15% and 40% with a molar percentage of neutralisation of the active acid sites by means of one or more monofunctional neutralisation agents of between 7% and 70%, a molar percentage of neutralisation of the active acid sites of the polymer by means of a neutralisation agent containing magnesium, barium, zinc or aluminum ion, or a difunctional amine, or mixtures thereof, of between 0% and 30%, and a molar percentage of non-neutralised active acid sites of between 15% and 78% and a weight average molecular weight of the homopolymers and/or copolymers of acrylic acid and/or methacrylic acid with one or more acrylic, vinyl or allyl monomers is between 5000 and 25,000.

9. The process of claim 8 wherein the light scattering coefficient for paper coated with the aqueous suspension of calcium carbonate and grinding aid agent is greater than 100 $m^2/kg$ for a coating weight of 20 $g/m^2$.

10. The process of claim 8, wherein the homopolymers and/or copolymers of acrylic acid and/or methacrylic acid with one or more acrylic, vinyl or allyl monomers are neutralized so that the molar percentage of neutralization of the active acid sites of the polymer by means of a neutralization agent containing a calcium ion is between 15% and 40% with a molar percentage of neutralization of the active acid sites by means of one or more monofunctional neutralization agents of between 20% and 50%, a molar percentage of neutralization of the active acid sites of the polymer by means of a neutralization agent containing magnesium, barium, zinc or aluminum ion, or a difunctional amine, or mixtures thereof, of between 0% and 30%, and a molar percentage of non-neutralized active acid sites of between 20% and 40%.

* * * * *